(12) United States Patent
Pandey

(10) Patent No.: US 7,953,006 B2
(45) Date of Patent: May 31, 2011

(54) HANDLING MULTIPLE POINT-TO-MULTIPOINT SERVICES

(75) Inventor: Ravi Pandey, Espoo (FI)

(73) Assignee: Nokia Corporation, Espoo (FI)

( * ) Notice: Subject to any disclaimer, the term of this patent is extended or adjusted under 35 U.S.C. 154(b) by 707 days.

(21) Appl. No.: 11/408,979

(22) Filed: Apr. 24, 2006

(65) Prior Publication Data

US 2007/0183434 A1 Aug. 9, 2007

(30) Foreign Application Priority Data

Feb. 9, 2006 (EP) .................................... 06101478

(51) Int. Cl.
*H04L 12/26* (2006.01)
(52) U.S. Cl. .................................... 370/230.1
(58) Field of Classification Search .................. 370/230, 370/230.1
See application file for complete search history.

(56) References Cited

U.S. PATENT DOCUMENTS

| 2003/0060210 | A1* | 3/2003 | Ravishankar et al. | 455/452 |
| 2003/0224794 | A1* | 12/2003 | Kim et al. | 455/445 |
| 2004/0105402 | A1* | 6/2004 | Yi et al. | 370/312 |
| 2004/0218607 | A1* | 11/2004 | Hurtta et al. | 370/395.21 |
| 2004/0223489 | A1* | 11/2004 | Rotsten et al. | 370/352 |

FOREIGN PATENT DOCUMENTS

| EP | 1 737 254 | 3/2005 |
| EP | 1 363 467 | 5/2006 |

OTHER PUBLICATIONS

Multimedia Broadcast/Multicast Service (MBMS) Architecture and Functional Description (Release 6), Mar. 2005, 3rd Generation Partnership Project TS23.246 V6.6.0.*
Multimedia Broadcast/Multicast Service (MBMS) Architecture and Functional Description (Release 6), Mar. 2005, to 3rd Generation Partnership Project TS23.246 V6.6.0.*
Multimedia Broadcast/Multicast Service (MBMS) Architecture and Functional Description (Release 6), Mar. 2005, to 3rd Generation Partnership Project TS23.246 V6.6.0 ( "3GPP").*
George Xylomenos and Vasilis Vogkas: Chapter 8: Wireless Multimedia in 3G Networks, Copyright 2005, pp. 235-259, Retrieved from Internet: http://www3.interscience.wiley.com/cgi-bin/booktext/112222464/BOOKPDFSTART , Published Online Jan. 3, 2006.
"Universal Mobile Telecommunications System (UMTS)" ETSI Standards, European Telecommunications Standards Institute, Sophia-Antipo, France, vol. 3-SA1, Version 6.6.0, Sep. 2004, pp. 7-8, 11, 20-22, 25-27 Figures 2,3 &7.

(Continued)

*Primary Examiner* — Ayaz R Sheikh
*Assistant Examiner* — Hai-Chang Hsiung
(74) *Attorney, Agent, or Firm* — Harrington & Smith

(57) ABSTRACT

For enabling multiple point-to-multipoint (PTM) services in a radio communication network system, when joining sessions relating to multiple PTM services is requested by a user equipment first, a first context between the user equipment and network elements providing the multiple PTM services is created, wherein the first context relates to signaling, and when activation of one of the sessions for which the first context has been created is requested by the user equipment first, a second context between the user equipment and network elements providing an PTM service of the multiple PTM services is created, to which PTM service the session relates, wherein the second context relates to user data of the PTM service.

34 Claims, 11 Drawing Sheets

OTHER PUBLICATIONS

"3rd Generation Partnership Project", Apr. 25, 2002, 3GPP TR 23.846 0.4., p. 17, Paragraph 7.1—p. 20, Paragraph 7.1.4, p. 25, Paragraph 7.2.1—p. 31, Paragraph 7.4.2.

Miikka Poikselka, Georg Mayer, Hisham Khartabil, Aki Niemi: "Chapter 13: GPRS" The Ims, Wiley, Chichester, GB, Published Online Jan. 28, 2005, Copyright © 2004 John Wiley & Sons, Ltd, pp. 165323-165325, XP002436247, Retrieved from Internet: http://www3.interscience.wiley.com/cgi-bin/booktext/109871762/BOOKPDFSTART.

International Search Report, Application No. PCT/IB2007/050326, 1 Filed Jan. 31, 2007.

* cited by examiner

HANDLING MULTIPLE POINT-TO-MULTIPOINT SERVICES

TECHNICAL FIELD

The present invention relates to point-to-multipoint services such as Multimedia Broadcast/Multicast Services (MBMS). In particular, the present invention relates to enabling multiple point-to-multipoint services in a radio communication network system by a point-to-multipoint service user.

BACKGROUND

In a point-to-multipoint service such as MBMS, data is transmitted from a single source entity to multiple recipients. Transmitting the same data to multiple recipients allows network resources to be shared. The MBMS bearer service offers two modes, a Broadcast Mode and a Multicast Mode. A reference architecture to support MBMS is shown in FIG. 1.

PS (Packet Switched) Domain functional entities such as GGSN (Gateway GPRS (General Packet Radio Service) Support Node), SGSN (Serving GPRS Support Node), UTRAN (UMTS (Universal Mobile Telecommunications System) Terrestrial RAN (Radio Access Network)), GERAN (GSM (Global System for Mobile communication) EDGE (Enhanced Data rates for Global Evolution) RAN), and UE (User Equipment) provide an MBMS Bearer Service. In a bearer plane, this service provides delivery of IP Multicast datagrams from a Gi reference point to UEs with a specified Quality of Service. In a control plane, this service provides mechanisms for managing an MBMS bearer service activation status of UEs (in the case of multicast mode), outsourcing authorization decisions to an MBMS User Service (i.e. to a BM-SC (Broadcast Multicast Service Centre) (in the case of multicast mode), providing control of session initiation/termination by the MBMS User Service and managing bearer resources for distribution of MBMS data (in the case or multicast and broadcast modes).

A particular instance of the MBMS Bearer Service is identified by an IP Multicast Address and an APN Network Identifier.

The boundary of the MBMS Bearer Service are Gmb and Gi reference points as shown in FIG. 1. The former provides access to control plane functions and the latter a bearer plane.

A functional entity, the Broadcast Multicast Service Centre (BM-SC), provides a set of functions for MBMS User Services. BM-SC functions for different MBMS User Services may be supported from the same or different physical network elements. The BM-SC provides functions for MBMS user service provisioning and delivery. It may serve as an entry point for content provider MBMS transmissions, used to authorize and initiate MBMS Bearer Services within the PLMN and can be used to schedule and deliver MBMS transmissions.

The UE supports functions for the activation/deactivation of the MBMS bearer service. Once a particular MBMS bearer service is activated, no further explicit user request is required to receive MBMS data although the user may be notified that data transfer is about to start. The UE supports security functions as appropriate for MBMS.

The UE should, depending on terminal capabilities, be able to receive MBMS user service announcements, paging information (non MBMS specific) and support simultaneous services (for example the user can originate or receive a call or send and receive messages whilst receiving MBMS video content). An MBMS Session Identifier contained in the notification to the UE enables the UE to decide whether it needs to ignore the forthcoming transmission of MBMS session (e.g. because the UE has already received this MBMS session).

The role of the SGSN within the MBMS architecture is to perform MBMS bearer service control functions for each individual UE and to provide MBMS transmissions to UTRAN/GERAN. The SGSN provides support for intra-SGSN and inter-SGSN mobility procedures. Specifically this requires the SGSN to store a user-specific MBMS UE context for each activated multicast MBMS bearer service and to pass these contexts to the new SGSN during inter-SGSN mobility procedures. The SGSN establishes Iu and Gn bearers shared by many users upon receiving a session start from the GGSN. Likewise, the SGSN is arranged to tear down these bearers upon instruction from the GGSN.

The role of the GGSN within the MBMS architecture is to serve as an entry point for IP multicast traffic as MBMS data. Upon notification from the BM-SC the GGSN requests the establishment of a bearer plane for a broadcast or multicast MBMS transmission. Further, upon BM-SC notification the GGSN is adapted to tear down the established bearer plane. Bearer plane establishment for multicast services is carried out towards those SGSNs that have requested to receive transmissions for the specific multicast MBMS bearer service. The GGSN may receive MBMS specific IP multicast traffic and route this data to the proper GTP tunnels set-up as part of the MBMS bearer service. The GGSN may also provide features that support the MBMS bearer service that are not exclusive to MBMS.

The current standard defines method and approach to establish MBM services for point to multipoint data transmission for a single MBM service to an MBMS user. However, the prior art handling of MBM services involves disadvantages as follows.

Present MBM services must be activated or deactivated before or after using an MBM service. In the light of the current mechanism, when a user intends to use an MBM service, the user will notify his intention via MM (Man Machine) interface and the UE will send a request IGMP (Internet Group Management Protocol) Join to the network for activating the MBM service. When the user desires to stop receiving the MBM service, he will leave the service by indicating this to the UE, which will then send a request IGMP Leave to the network for deactivating the MBM service.

As the UE may activate tens of MBM services the same time, it may become quite tedious to indicate the joining and leaving the desired services one by one to the UE. Moreover, according to the prior art, activation of tens of MBM services also means tens of MBMS PDP (Packet Data Protocol) contexts per UE which burdens network resources.

SUMMARY

The invention aims to solve the above problems and to enable multiple point-to-multipoint services by a point-to-multipoint service user with reduced network resource burden.

According to an aspect of the invention, for enabling multiple point-to-multipoint (PTM) services in a radio communication network system, when joining sessions relating to multiple PTM services is requested by a user equipment first, a first context between the user equipment and network elements providing the multiple PTM services is created, wherein the first context relates to signaling, and when activation of one of the sessions for which the first context has been created is requested by the user equipment first, a second context between the user equipment and network elements providing an PTM service of the multiple PTM services is created, to which PTM service the session relates, wherein the second context relates to user data of the PTM service.

For the purpose of the present invention to be described herein below, it should be noted that any method step is suitable to be implemented as software or by hardware without changing the idea of the present invention. In addition, devices can be implemented as individual devices, but this does not exclude that they are implemented in a distributed fashion throughout the system, as long as the functionality of the device is preserved.

In terms of user experience, the activation or deactivation of PTM services such as MBMSs is transparent to the user and therefore it is unnecessary to couple user's command and UE's activation/deactivation to one-to-one relationship. The decoupling of user's command via MMI and the UE's activation/deactivation is rational in the following two cases:

1. A user is interested in sport related channels and he finds some channels via service announcements. He likes to be able to receive all the channels, and in this case it is quite boring to indicate his command of joining or leaving his desired services one by one to the UE;
2. A user may switch off his UE when sleeping at night and when he switches on his UE after getting up the next morning, he would possibly like to receive the same set of services he joined the previous day.

The above case 1 may be an implementation issue for the MMI to be configured to notify the UE multiple times while accepting only one command from the user. This issue is outside the scope of the present invention.

The above case 2 needs enhancement of prior art processing of the PTM service such as the MBMS in the network, e.g. the network may decide not to purge the MBMS information of a UE for a considerably long time when UE switches off in order that the UE does not need to activate/deactivate the same set of services again when switching on.

The present invention enables the functional entities involved in the MBM service to save the MBMS information.

The benefits from the enhancement according to the invention comprise network resource optimization, latency decrease and radio burden reduce.

In particular, an UE may activate tens of MBM services at the same time, which means tens of MBMS PDP contexts per UE with the prior art 3GPP (third Generation Partnership Project) solution. This invention helps to reduce the number of PDP contexts to two (e.g. a User Plane and a Control Plane PDP context) independent of the number of MBM services the user is interested in.

The UE can simultaneously be connected to multiple MBM services and can switch between the services as per the available services and personal interest (like TV channels). This optimizes network signaling and latency compared to the prior art solution.

According to an implementation example, two new IGMP messages are presented to support User Plane PDP context to activate and/or deactivate the MBM services.

BRIEF DESCRIPTION OF THE DRAWINGS

In the following the present invention will be described by way of embodiments thereof taking into account the accompanying drawings, in which.

DESCRIPTION OF THE PREFERRED EMBODIMENTS

Figure 2:
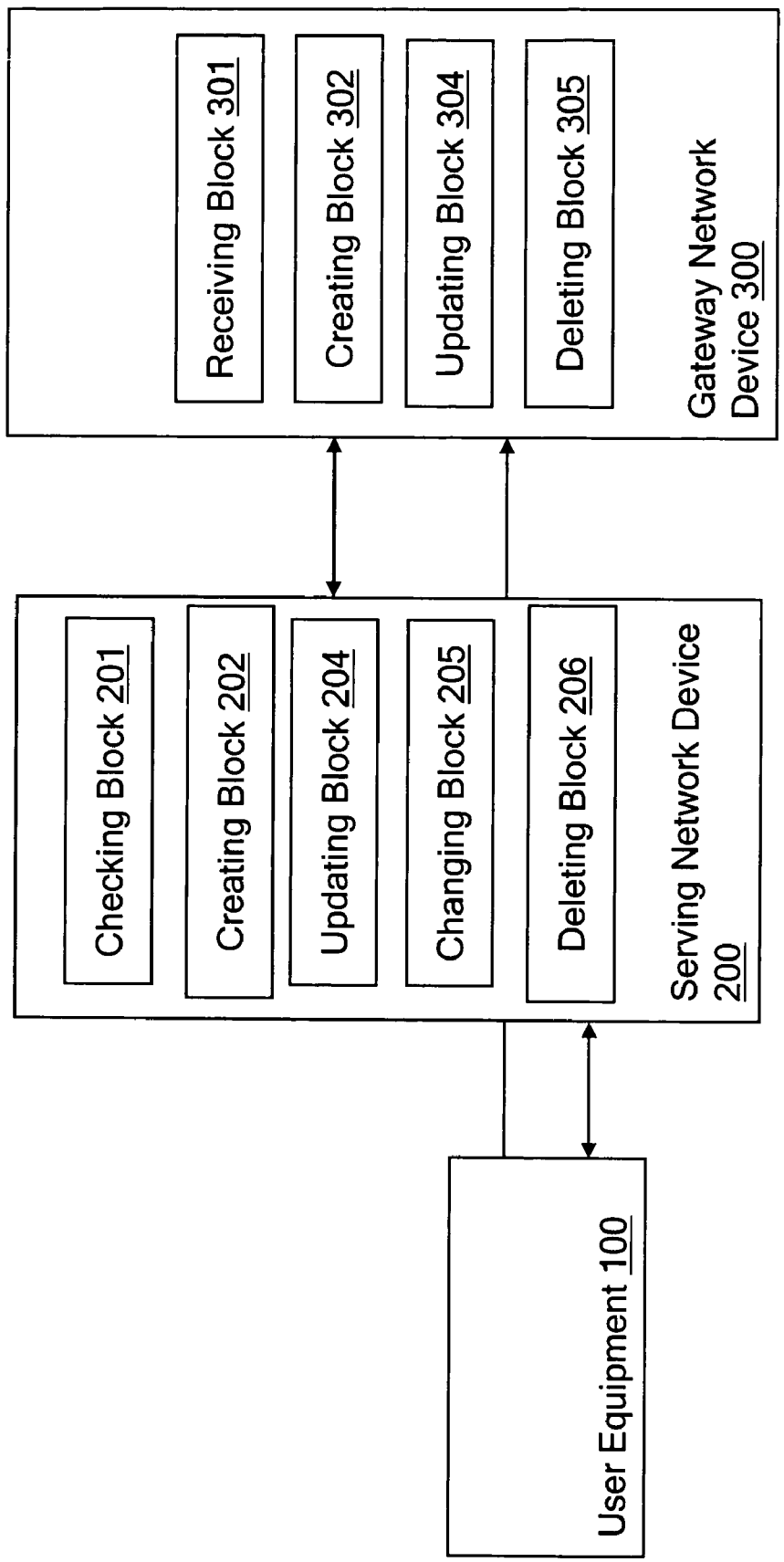
FIG. 2 shows a schematic block diagram illustrating a User Equipment (UE) 100, a serving network device 200 and a gateway network device 300 according to an embodiment of the invention.

FIG. 2 shows a schematic block diagram illustrating a User Equipment (UE) 100, a serving network device 200 and a gateway network device 300 according to an embodiment of the invention for enabling multiple point-to-multipoint (PTM) services in a radio communication network system.

The user equipment 100 may transmit a request for joining a session relating to a PTM service such as an MBM (Multimedia Broadcast/Multicast) service for creating or updating a first context between the user equipment and network elements providing the PTM service, wherein the first context relates to signaling. According to the architecture shown in FIG. 1, the first context may by an MBMS control plane PDP context.

In this description, the term "network elements providing an PTM service" means all or part of the network elements involved in signaling/data flow required for the PTM service. According to the architecture shown in FIG. 1, these network elements comprise GGSNs and BM-SCs.

The user equipment 100 may further transmit a request for activating one session of sessions for which the first context is present for creating or updating a second context between the user equipment and network elements providing an PTM service to which the one session relates, wherein the second context relates to user data of the PTM service to which the one session is related. According to the architecture shown in FIG. 1, the second context may by an MBMS user plane PDP context.

The user equipment 100 may also transmit a request for de-activating the one session for deleting the second context.

In addition, the user equipment 100 may transmit a request for leaving a session for which the first context is present for deleting the first context and, if present, the second context in the network elements providing an PTM service to which the session relates.

Figure 1:
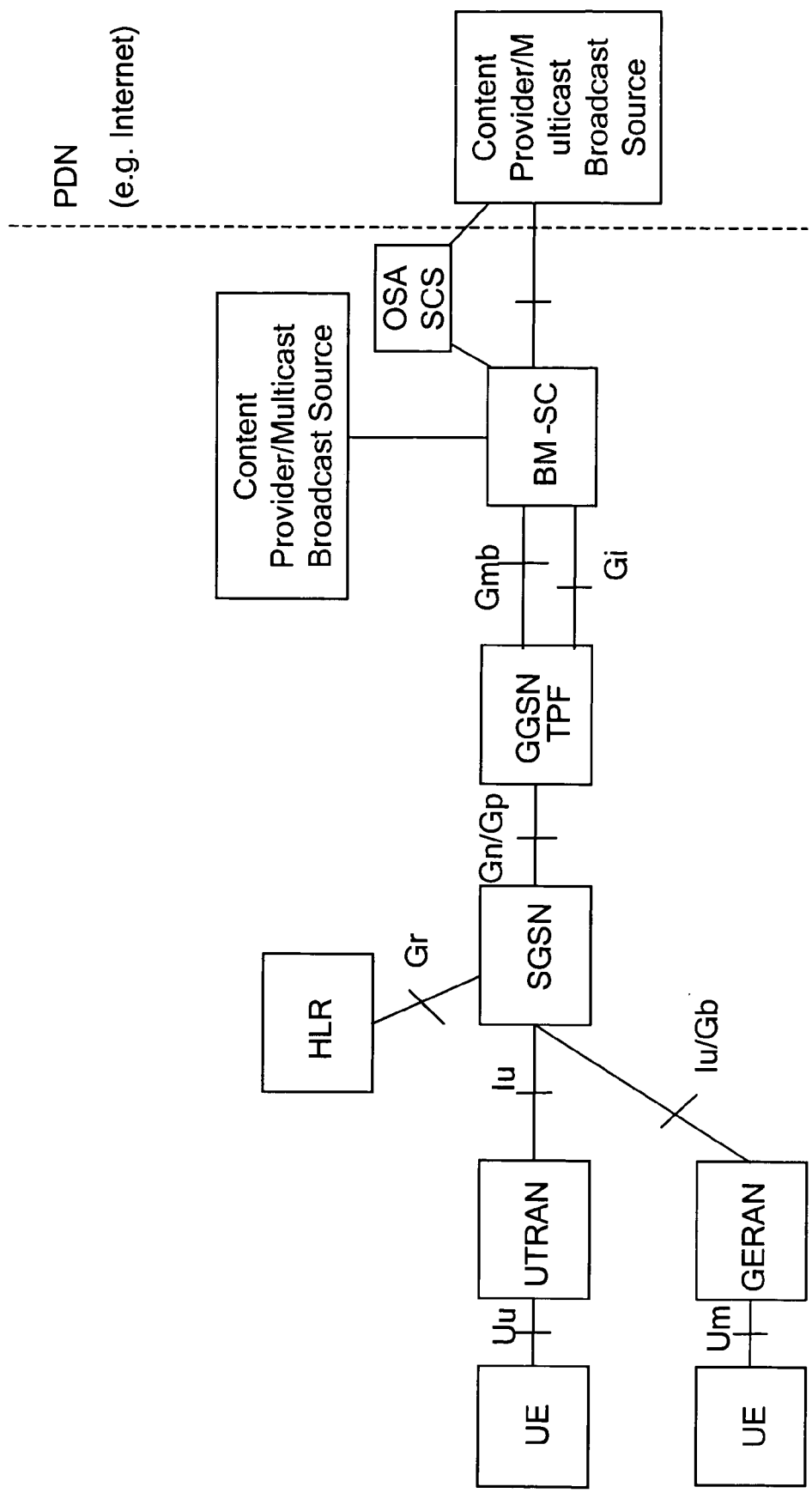
FIG. 1 shows a schematic block diagram illustrating a reference architecture to support MBMS.

According to the architecture shown in FIG. 1, the user equipment 100 may transmit the above requests towards an SGSN/GGSN of a core network via a radio access network.

The serving network device 200 which may comprise an SGSN according to the architecture shown in FIG. 1 comprises a checking block 201 and a creating block 202. The serving network device 200 may further comprise an updating block 204, a changing block 205, and a deleting block 206.

The gateway network device 300 which may comprise an GGSN according to the architecture shown in FIG. 1 comprises a receiving block 301 and a creating block 302. The gateway network device 300 may further comprise an updating block 304, and a deleting block 305.

In the serving network device 200, upon a request for joining a session relating to an PTM service by the user equipment 100, the checking block 201 determines whether or not a first context between the user equipment and network elements providing any PTM service is present. The creating block 202 creates the first context between the user equipment 100 and the network elements providing the PTM service in case it is determined that the first context is not present, wherein the first context relates to signaling.

The creating block 202 may create a tree structure virtually connecting the network elements providing the PTM services in the list.

Otherwise, in case it is determined that the first context is present, the updating block 204 updates a list of PTM services to which sessions relate for which the first context is present, by adding the PTM service to the list.

Moreover, upon a request for activating one session of sessions for which the first context is present, the checking block 201 determines whether or not a second context between the user equipment 100 and network elements providing an PTM service to which any one session of the sessions relates is present. The creating block 202 creates the second context between the user equipment 100 and network elements providing an PTM service to which the one session relates in case it is determined that the second context is not present, wherein the second context relates to user data of the PTM service to which the one session is related.

The creating block 202 may create the second context such that one user plane flow of the user data of the PTM service is enabled at a given time for the user equipment 100.

Otherwise, in case it is determined that the second context is present, the changing block 205 changes the second context by updating it with network elements providing the PTM service to which the one session relates.

Sessions relating to the PTM services in the list may be classified in an active session comprising the session for which the first and second contexts are present and inactive sessions for which the first context is present and the second context is not present.

Upon a request for de-activating the one session, the deleting block 206 deletes the second context in response to the request.

Upon a request for leaving a session for which the first context is present, the updating block 204 deletes a PTM service to which the session relates from the list in response to the request. The deleting block 206 deletes the first context and, if present, the second context in the network elements providing the PTM service.

In the gateway network device 300, when the receiving block 301 receives a request for joining a session relating to an PTM service by the user equipment 100, the creating block 302 creates a first context between the user equipment 100 and network elements providing the PTM service in case it is determined that the first context between the user equipment and network elements providing any PTM service is not present. The creating block 202 of the serving network device 200 may request creating the first context.

Otherwise, in case it is determined that the first context is present, the updating block 304 updates a list of PTM services to which sessions relate for which the first context is present, by adding the PTM service to the list.

When the receiving block 301 receives a request for activating one session of sessions for which the first context is present, the creating block 302 creates a second context between the user equipment and network elements providing an PTM service to which the one session relates.

When the receiving block 301 receives a request for de-activating the one session, the deleting block 305 deletes the second context in response to the request.

When the receiving block 301 receives a request for leaving a session for which the first context is present, the deleting block 305 may delete the first context and, if present, the second context in the network elements providing an PTM service to which the session relates upon the request. The updating block 304 may delete the PTM service from the list in response to the request.

It is to be noted that the arrangement of the blocks of the network devices 200, 300 shown in FIG. 2 is not intended to limit the invention to this arrangement. For example, all or part of the functions of the blocks of each network device 200, 300 may be combined and performed by one or more super-blocks, or the functions of one block may be further divided into sub-blocks.

Figure 3:
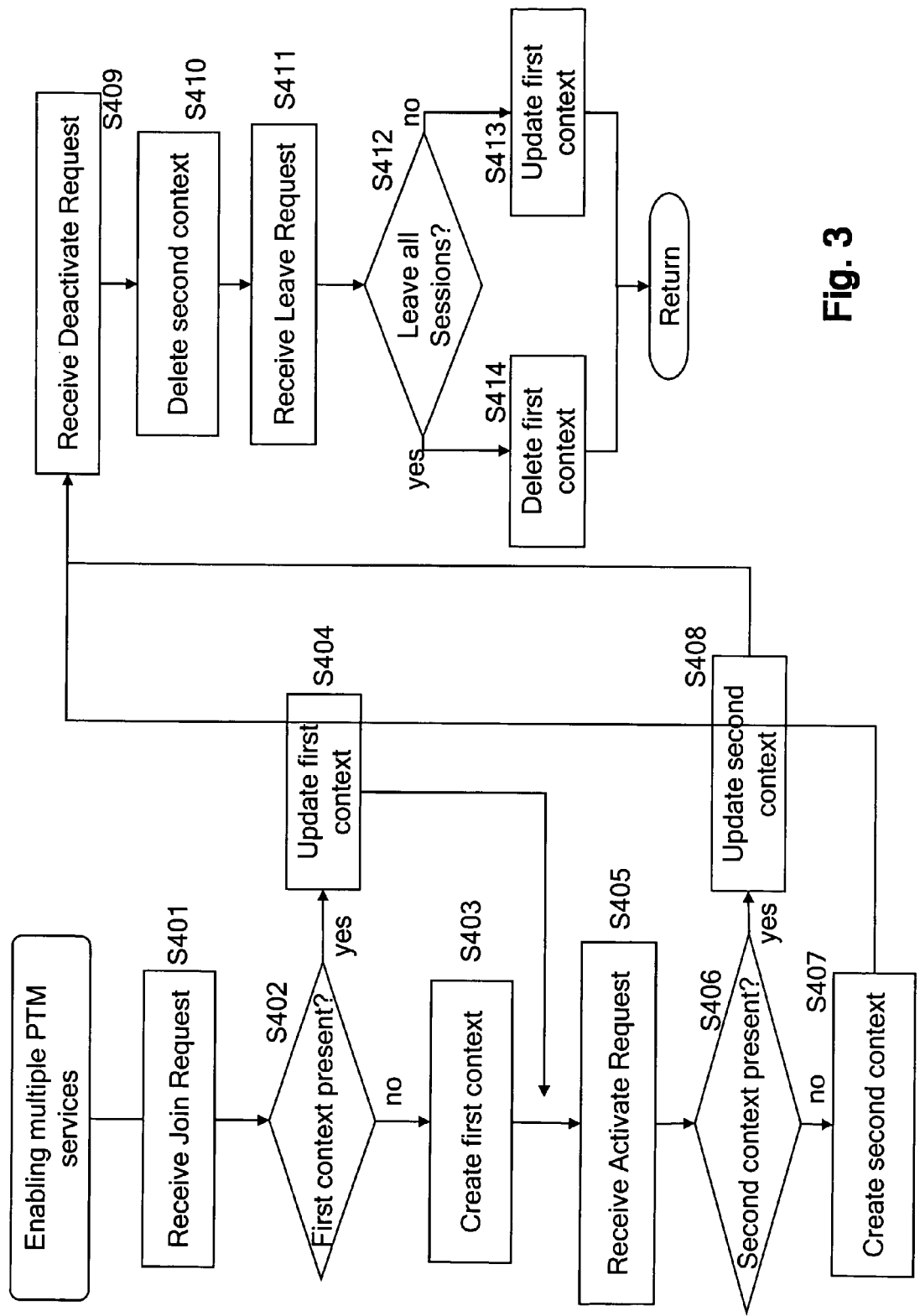
FIG. 3 shows a flow chart illustrating a method of enabling multiple PTM services by a PTM service user according to an embodiment of the invention.

FIG. 3 shows a flow chart illustrating a method of enabling multiple PTM services by an PTMS user according to an embodiment of the invention.

In case a join request is received from a user equipment (e.g. user equipment 100 of FIG. 2) by a core network (which may comprise the network devices 200, 300 of FIG. 2) in step S401 in FIG. 3, it is checked by the core network whether or not a first context between the user equipment and network elements providing any PTM service is present in step S402. In case the first context is not present (NO in step S402), the first context between the user equipment and the network elements providing the PTM service is created in step S403. Otherwise, if YES in step S402, the first context is updated with the requested PTM service in step S404.

In case an activate request is received from the user equipment by the core network in step S405 when the first context has already been created, it is checked by the core network in step S406 whether or not a second context between the user equipment and network elements providing an PTM service to which any one session of the sessions relates is present.

In case the second context is not present (NO in step S406), in step S407 the second context is created between the user equipment and network elements providing an PTM service to which the one session relates. Otherwise, if YES in step S406, the second context is changed in step S408 by updating it with network elements providing the PTM service to which the one session relates.

In case an activate request is received when no first context has been created, the active request is disregarded.

In case a deactivate request is received from the user equipment by the core network in step S409, the second context is deleted in step S410. The second context is deleted only in case it has been created beforehand. Otherwise, the deactivate request is disregarded.

In case a leave request is received from the user equipment by the core network in step S411, it is checked by the core network in step S412 whether all sessions for which the first context has been created should be leaved by the leave request. In case all sessions are to be leaved (YES in step S412), the first context and, if present, the second context are deleted in step S414.

Otherwise, if NO in step S412, the first and second contexts are updated, i.e. deleted only in the network elements involved in the session(s) to be leaved.

The leave request may also be received before an activate and/or deactivate request. In case the leave request is received before a first context has been created, it is disregarded.

When the first context is created, a tree structure may be created which virtually connects the network elements providing the multiple PTM services to which the joined sessions relate.

The second context may be created such that one user plane flow of the user data of the PTM service is enabled at a given time for the user equipment.

As described above, the first context is updated when joining a session of a further PTM service is requested by the user equipment, wherein the multiple PTM services are updated with the further PTM service. Moreover, at least one session of the sessions is deleted when leaving the at least one session is requested by the user equipment. The first context and, if present, the second context are deleted, when leaving all of the sessions is requested by the user equipment.

Moreover, the second context is updated when activation of another one session of the sessions is requested by the user equipment, wherein the second context is updated with the network elements providing an PTM service to which the another one session relates. The second context is deleted when de-activation of the session is requested by the user equipment.

Creating the first and second contexts for the session for which activation has been requested may be prioritized. In addition, the sessions may be classified in an active session comprising the session for which activation has been requested and inactive sessions comprising remaining sessions of the sessions.

In the following, an embodiment of the invention will be described taking into account the architecture shown in FIG. 1.

As described above, the invention provides a separate context for signaling purposes only and a separate context for PTM user data.

Figure 4:
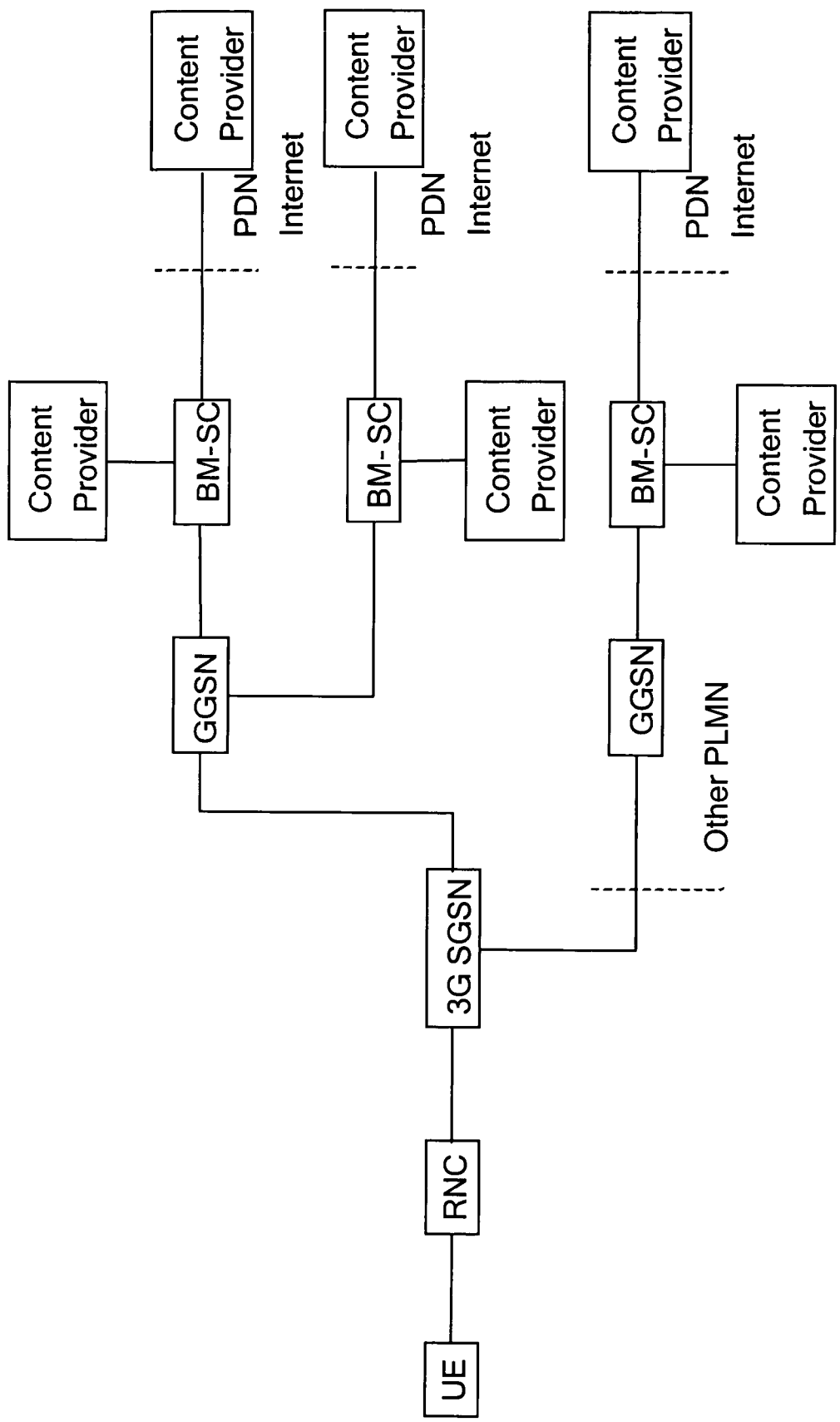
FIG. 4 shows a schematic block diagram illustrating an example site solution for MBM services according to the invention.

Referring to FIG. 4, in a site solution for MBM services according to the invention, multiple BM-SCs may be connected to GGSN for different MBM services, a UE may contact a GGSN in another PLMN (Public Land Mobile Network) to get MBM services, and each BM-SC can have its own content provided or may be some 3$^{rd}$ party service provided.

In order to support tens of MBM services for a UE at a given time, for multiple MBM services for the UE the invention provides a separate PDP context for signaling purpose only, i.e. an "MBMS Control Plane PDP context", and a separate PDP context for MBMS user data, i.e. an "MBMS User Plane PDP context".

The idea behind the above PDP contexts is to maintain one control plane PDP context for all MBMS sessions the UE wants to create. That means that the MBMS control PDP context is different from the prior art PDP context. The control plane PDP context creates a tree structure virtually connecting all required (i.e. involved) network elements for MBM services for a user.

The PDP context for User plane enables one user plane flow for a UE at a given time. MBMS bearer context is mapped to User Plane PDP context.

It is to be noted that there is no MBMS user data flowing through this context but just mapping to different bearer context. Counting on advantages, fast switching (with less signaling) between different services and switching between different quality of services for same MBMS service can be achieved.

This can be done when UE shows interest on viewing one MBMS session (like a particular TV channel even if multiple channels are available at a given time).

Figure 5:
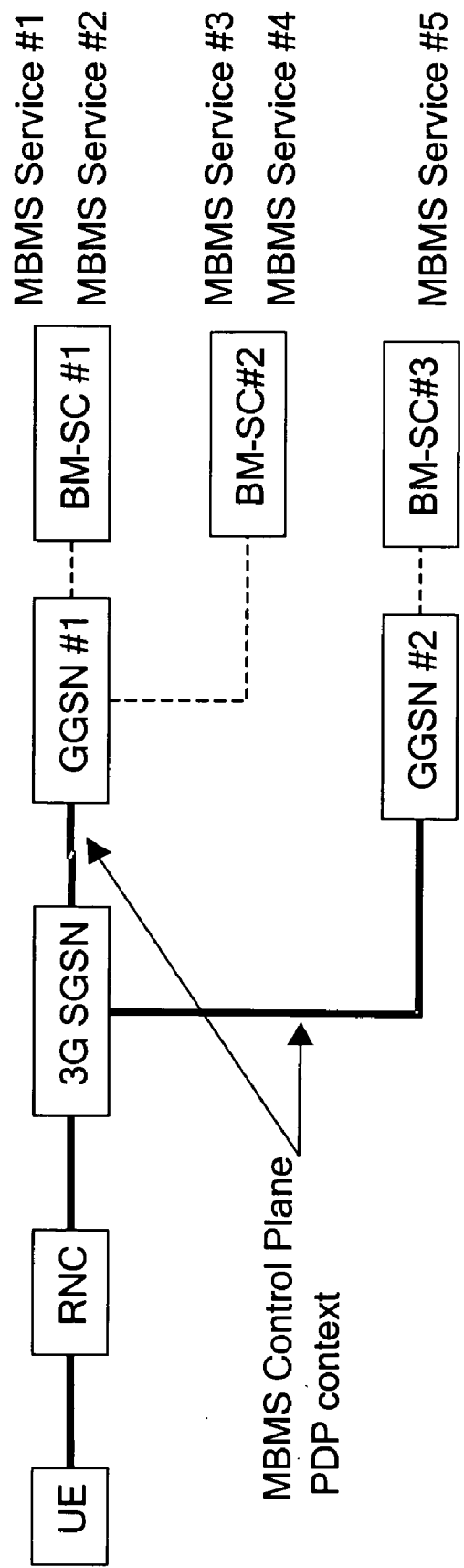
FIG. 5 shows a schematic block diagram illustrating an MBMS control plane PDP context according to the invention when the UE wants to enable multiple MBM services.

FIG. 5 shows a schematic block diagram illustrating an MBMS control plane PDP context according to the invention when the UE wants to enable multiple MBM services. In FIG. 5, if the UE wants to enable multiple MBM services, an SGSN associated with the UE creates a control plane PDP context that includes all required GGSNs (i.e. GGSNs involved in the MBM services) in a tree structure (indicated by bold lines). The GGSNs, on the other-hand hold a list of multicast addresses of BM-SCs associated with the control Plane PDP context (indicated by dashed lines).

The following table shows an Information Element MBMS Control Plane PDP context.

| Parameter | Description | UE | SGSN | GGSN |
|---|---|---|---|---|
| TMGI | Temporary Mobile group identity allocated to the MBMS bearer | X | X | |
| Linked NSAPI | NSAPI of the PDP context used by the UE to carry IGMP/MLD Signalling | X | X | |
| IMSI | IMSI identifying the uses | (1) | (1) | X |
| TI | Transaction identifier | X | X | |
| MBMS_NSAPI | Network Layer service Access Point identifier which identifies an MBMS UE context | X | X | X |
| SGSN address | The IP address of SGSN | | | X |
| Information Element for Active MBM services | | | | |
| IP Multicast Address | IP Multicast address identifying an MBMS bearer that the UE has joined | X | X | X |
| APN | Access Point Name on which this IP multicast address is defined | X | X | X |
| GGSN Address in Use | The IP address of the GGSN currently used | | | X |
| Information Element for Inactive MBM services (multiples entry) | | | | |
| IP Multicast Address [list] | IP Multicast address identifying an MBMS bearer that the UE has joined | X | X | X |
| APN [list] | Access Point Name on which this IP multicast address is defined | X | X | X |
| GGSN Address [list] | The IP address of the GGSN currently used | | | X |

The MBMS UE control plane context contains UE-specific information related to a particular MBMS bearer service that the UE has joined/activated. An MBMS UE control plane context is created in the UE, SGSN, GGSN and BM-SC Membership function when the UE joins/activates an MBMS bearer service.

In the UE and SGSN, the MBMS UE control plane context is stored as part of the MM Context for the UE. The MBMS UE control plane context is stored in the GGSN. There is one MBMS UE control plane context for all the MBMS bearer services that the UE has joined. The content of the MBMS UE control plane context is described in the above table. Reference (1) in the table means that in the UE and SGSN, the IMSI is available within the MM Context which contains the MBMS UE control plane context.

According to the above table, there is an information element for an active MBM service, i.e. for a service activated by the UE using the above activate request (a service for which the second context or user plane PDP context has been created). Moreover, there is an information element for inactive MBM services comprising multiple entries, i.e. remaining services for which no second context has been created).

Figure 6:
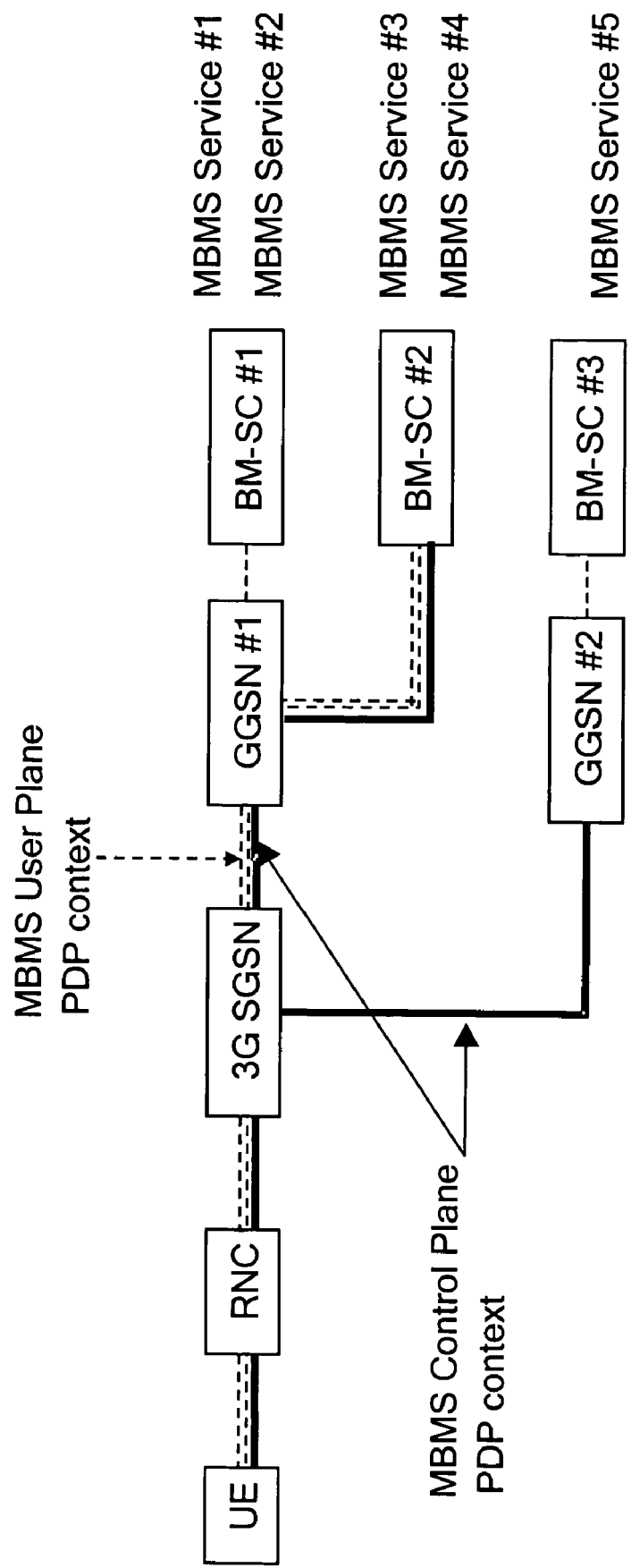
FIG. 6 shows a schematic block diagram illustrating an MBMS control plane PDP context and an MBMS user plane PDP context according to the invention when the UE wants to enable MBM service #3 at a given time.

FIG. 6 shows a schematic block diagram illustrating an MBMS control plane PDP context and an MBMS user plane PDP context according to the invention when the UE wants to enable MBM service #3 at a given time. A PDP context for User plane enables one user plane flow for the UE at a given time by mapping it to the MBMS bearer context. The PDP context for User Plane is created when the UE shows interest on viewing one MBMS session (like a TV channel even if multiple channels are available at a given time). According to FIG. 6, the UE is interested in MBM service #3; hence the MBMS User Plane PDP context is created via GGSN#1. In FIG. 6, the control plane PDP context is shown by bold lines, and the user plane PDP context is shown by doubled dashed lines.

The information element of the MBMS User Plane PDP context is same as the information element of the above table, but only maintains the information of an ongoing MBMS session, i.e. the information element for the active MBM service.

Figure 7:
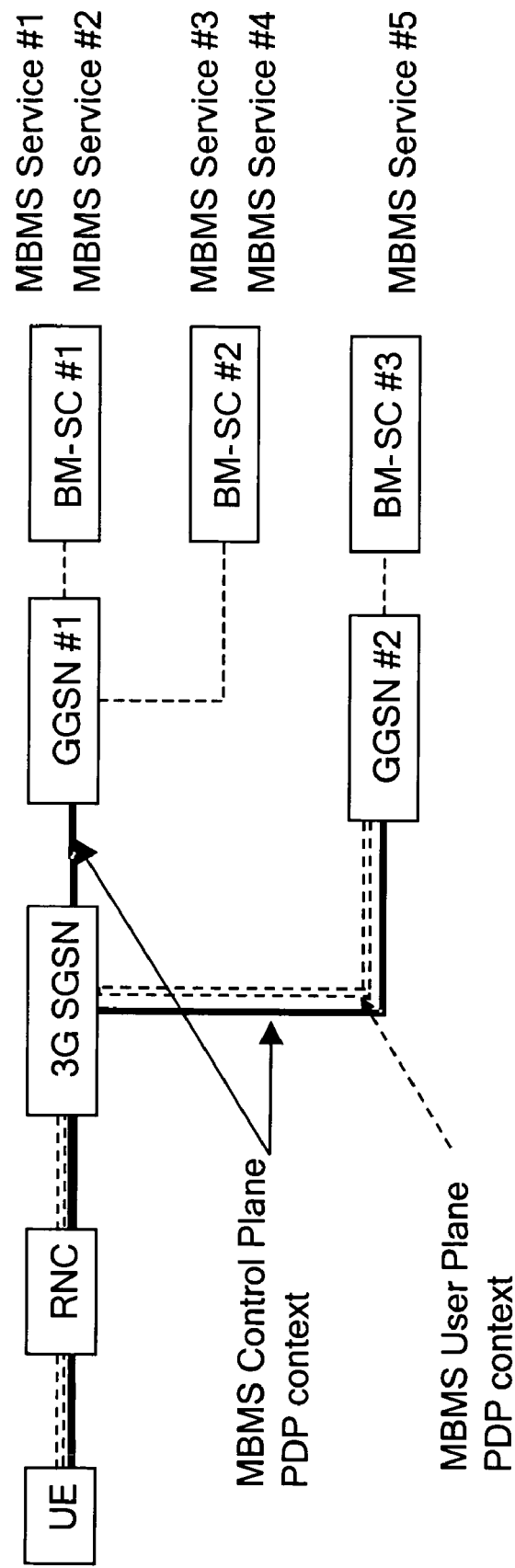
FIG. 7 shows a schematic block diagram illustrating an MBMS control plane PDP context and an MBMS user plane PDP context according to the invention when the UE switches MBM services.

When the UE decides to change/switch between MBM services, the control plane PDP context remains unchanged (with tree structure as shown in FIG. 5). If "MBMS User Plane PDP Context" exists, it is updated with a GGSN associated with the changed service. Otherwise, a new User Plane PDP context is created. FIG. 7 shows the control plane PDP context and the user plane PDP context viewed from the 3G SGSN when the service is switched to MBM Service #5. The control plane PDP context is indicated by bold lines and the user plane PDP context is indicated by doubled dashed lines.
New IGMP Messages (IGMP Activate, IGMP Deactivate) for User Plane PDP Context While switching between the MBM services, a new IGMP message (called "IGMP Deactivate") is provided enabling deactivation of "MBMS User Plane PDP context" of an ongoing MBM service. With this new message the MBMS data from one MBM service (ongoing) can be held before switching to other service, and the "MBMS Control Plane PDP context" can be maintained with last ongoing MBM service.

In other words, MBMS data of an ongoing MBM service can be held until an IGMP deactivate message is issued.

The UE may select/switch an MBM service; a new IGMP message (called "IGMP Activate") is provided to activate "MBMS User Plane PDP context" for an MBM service.
IGMP Messages (IGMP Join, IGMP Leave) for Control Plane PDP Context The prior art IGMP messages (e.g. Join and Leave) are utilized for Control Plane PDP Context only.

IGMP Join: shall create Control Plane PDP context and/or update the existing list of MBM services that UE is interested in.

IGMP Leave: shall delete Control Plane PDP context and/or update the existing list of MBM services that UE is not interested in.

MBMS Registration and Deregistration Procedures are associated with MBMS User Plane PDP context creation and deletion. Network initiated MBMS Deregistration procedure is performed according to the prior art.

With respect to an Inter SGSN Routing Area Update Procedure, the SGSN creates MBMS Control and User Plane PDP context for an active MBMS session as a first priority to ensure no data loss. Later it establishes the MBMS control plane PDP context from the list for inactive sessions.

In the following an implementation example of the present invention will be described by referring to FIGS. 8-11.

Figure 8:
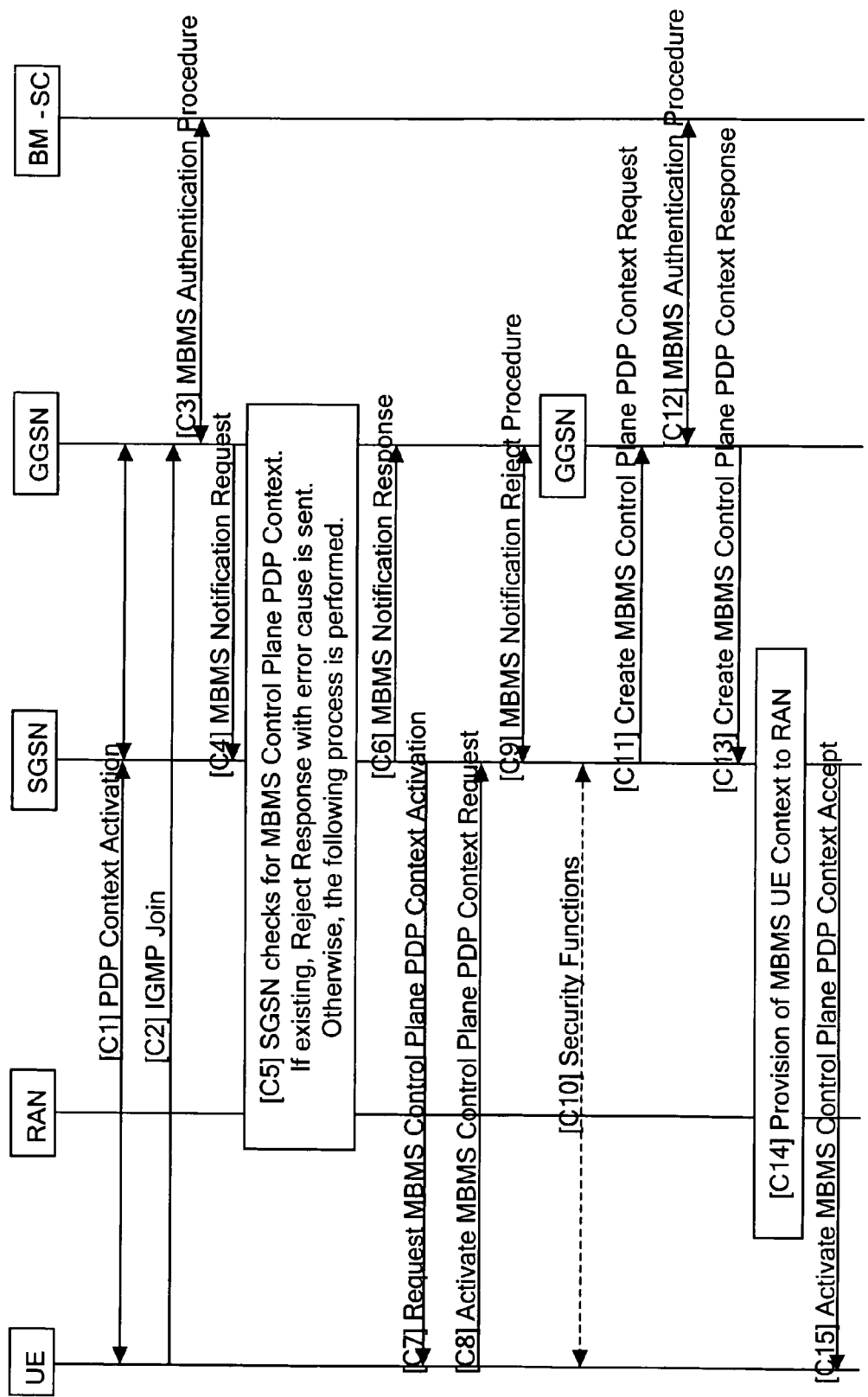
FIG. 8 shows a signaling diagram illustrating activation of an MBMS control Plane PDP context for Multicast Service.

FIG. 8 shows a signaling diagram illustrating activation of an MBMS control Plane PDP context for Multicast Service.

In communication [C1] the UE activates a default, typically best-effort PDP context if not already established. This can be a PDP context used for basic IP services like WAP or Internet access, or it might be the signaling PDP context used for IMS access.

In communication the [C2] UE sends an IGMP (IPv4 (Internet Protocol version 4)) or MLD (IPv6) Join message over the default PDP context to signal its interest in receiving a particular multicast MBMS bearer service identified by an IP multicast address.

In communications [C3] an authentication procedure is performed between the GGSN and the BM-SC providing functions for the requested MBMS service, in which the GGSN sends an MBMS Authorization Request seeking authorization for the activating UE to receive data. The authorization decision, which may be based on subscription data in the BM-SC, Membership function is provided in the MBMS Authorization Response together with the APN to be used for creation of the MBMS UE context. If the MBMS Authorization Response indicates that the UE is not authorized to receive the MBMS data the process terminates with no additional message exchange.

In communication [C4] the GGSN sends an MBMS Notification Request (IP multicast address, APN, Linked NSAPI) to the SGSN. Linked NSAPI is set equal to the NSAPI of the PDP context over which the Join request was received. The IP multicast address is the one requested by the UE in the Join request. The APN may be different from the APN to which the default PDP context has been activated. In any case, the APN may resolve to a GGSN that is different from the GGSN receiving the IGMP/MLD Join request. The GGSN starts a MBMS Activation Timer as GGSN may receive no response, e.g. in case SGSN or UE does not support MBMS.

In communication [C5] the SGSN checks for a MBMS control plane PDP context. If the MBMS control plane PDP context exists, a reject response is returned including an error cause.

In communication [C6] the SGSN sends an MBMS Notification Response (Cause) to the GGSN that sent the MBMS Notification Request, where Cause shall indicate whether or not the MBMS context activation will proceed.

Upon reception of the response message with Cause indicating unsuccessful operation the GGSN should not send any further MBMS Notification Request messages. The procedure is then terminated.

In communication [C7] the SGSN sends a Request MBMS Control Plane PDP Context Activation (IP multicast address, APN (Access Point Name), Linked NSAPI (Network Service Access Point Identifier), TI (Transaction Identifier) to the UE to request it to activate an MBMS UE Control Plane Context. Linked NSAPI allows the UE to associate the MBMS UE Control Plane Context with the PDP context over which it sent the IGMP/MLD Join message in communication [C2].

TI was chosen by the SGSN and contains a value not used by any other activated PDP context and MBMS UE context for this UE.

In communication [C8] the UE creates an MBMS UE control plane context and sends an Activate MBMS Control Plane PDP Context Request (IP multicast address, APN, MBMS_NSAPI, MBMS bearer capabilities) to the SGSN. The IP multicast address identifies the MBMS multicast service, which the UE wants to join/activate. An APN may indicate a specific GGSN. The MBMS bearer capabilities indicate the maximum QoS the UE can handle. The MBMS_NSAPI was chosen by the UE and contains a value not used by any other activated PDP context and MBMS UE context for this UE. If the SGSN has the MBMS Bearer Context information for this MBMS bearer service, the SGSN should verify the UE's MBMS bearer capabilities. If the SGSN determines that the UE's MBMS bearer capabilities are less than the Required MBMS Bearer Capabilities, it shall reject the request for activation of an MBMS context with an appropriate cause.

In communications [C9] an MBMS Notification Reject Procedure is performed between the SGSN and the GGSN. If the MBMS UE Control Plane Context was not established, the SGSN sends a MBMS Notification Reject Request (Cause) to the GGSN that sent the MBMS Notification Request, where Cause shall indicate the reason why the MBMS UE Control Plane Context could not be established. The GGSN then sends a MBMS Notification Reject Response back to the SGSN. This should prevent further sending of MBMS Notification Request messages. The procedure is then terminated.

In communications [C10] Security Functions may be performed, e.g. to authenticate the UE.

In communication [C11] the SGSN creates an MBMS UE control plane context and sends a Create MBMS control plane Context Request (IP multicast address, APN, MBMS_NSAPI, IMSI (International Mobile Subscriber Identity), MSISDN (Mobile Station International ISDN (Integrated Services Digital Network) Number), RAI (Routing Area Identification) to the GGSN.

In communications [C12] an MBMS Authentication procedure is performed between the GGSN and the BM-SC. The GGSN sends an MBMS Authentication Request (IMSI, MSISDN, RAI) seeking authentication for the activating UE. The authentication decision is provided in the MBMS Authentication Response. The BM-SC creates an MBMS UE Control Plane Context.

In communication [C13] the GGSN creates an MBMS UE control plane context and sends a Create MBMS Control Plane Context Response to the SGSN.

In communication [C14] the SGSN provides Iu mode RAN with the MBMS UE Control Plane Context if at least one PS RAB is established for the UE.

Finally, in communication [C15] the SGSN sends an Activate MBMS Control Plane Context Accept (TMGI, MBMS bearer capabilities) to the UE. The MBMS bearer capabilities indicate the maximum QoS that is used by this MBMS bearer service and the UE may take it into account when further MBMS bearer services are activated. If it was not possible to verify the UE's MBMS bearer capabilities in [C8], the UE's MBMS bearer capabilities will be verified now. If the SGSN determines that the UE's MBMS bearer capabilities are lower than the Required MBMS Bearer Capabilities the SGSN rejects the request for activation of an MBMS control plane context indicating an appropriate cause and starts the deactivation of the already established MBMS UE control plane context.

Figure 9:
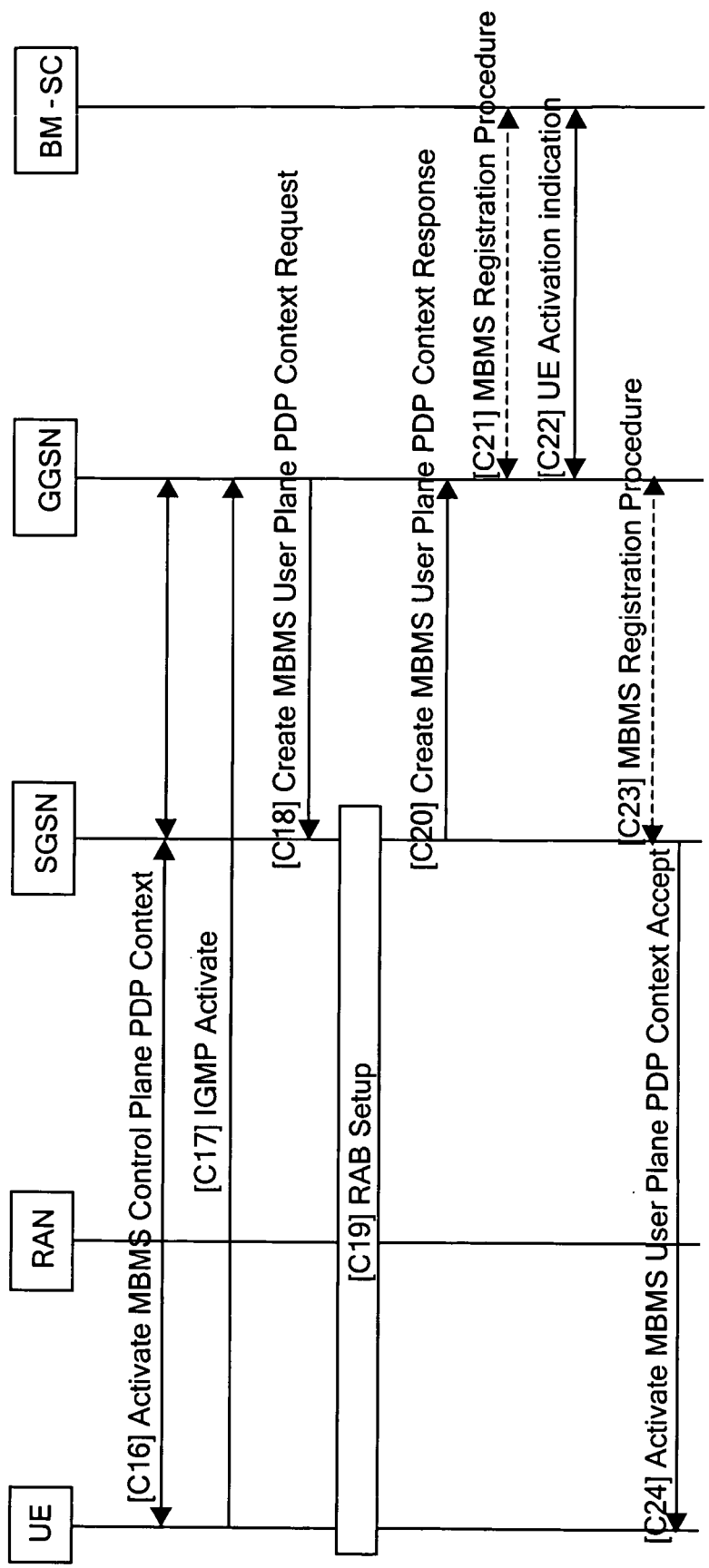
FIG. 9 shows a signaling diagram illustrating activation of an MBMS User Plane PDP context for Multicast Service.

FIG. 9 shows a signaling diagram illustrating activation of an MBMS User Plane PDP context for Multicast Service.

In communications [C16] the MBMS Control Plane PDP context is established as described in connection with FIG. 8.

In communication [C17] the UE sends an IGMP activate message over the created MBMS control plane PDP context to signal its selection of the particular multicast MBMS bearer service for which the control plane context has been created in communications [C16].

In communication [C18] the GGSN creates an MBMS UE user plane context and sends a Create MBMS user plane Context Request to the SGSN.

In communication [C19] RAB (Radio Access Bearer) setup is performed.

In communication [C20] the SGSN creates an MBMS UE user plane context and sends a Create MBMS User Plane Context Response to the GGSN.

In communications [C21] an MBMS registration procedure is performed between the GGSN and the BM-SC. If the GGSN does not have the MBMS Bearer Context information for this MBMS bearer service, the GGSN sends a MBMS Registration Request to the BM-SC. If no TMGI has been allocated for this MBMS bearer service, the BM-SC will allocate a new TMGI. This TMGI will be passed to GGSN and SGSN via the MBMS Registration Response message and further to UE via Activate MBMS User Plane Context Accept message. The BM-SC responds with a MBMS Registration Response containing the MBMS Bearer Context information for this MBMS bearer service and adds the identifier of the GGSN to the "list of downstream nodes" parameter in its MBMS Bearer Context.

In communications [C22] UE Activation is indicated between the GGSN and the BM-SC.

In communications [C23] MBMS Registration Procedure is performed between the SGSN and the GGSN. If the SGSN does not have the MBMS Bearer Context information for this MBMS bearer service, the SGSN sends a MBMS Registration Request to the GGSN. The GGSN responds with a MBMS Registration Response containing the MBMS Bearer Context information for this MBMS bearer service and adds the identifier of the SGSN to the "list of downstream nodes" parameter in its MBMS Bearer Context.

Finally, in communication [C24] the SGSN sends an Activate MBMS User Plane Context Accept to the UE.

Figure 10:
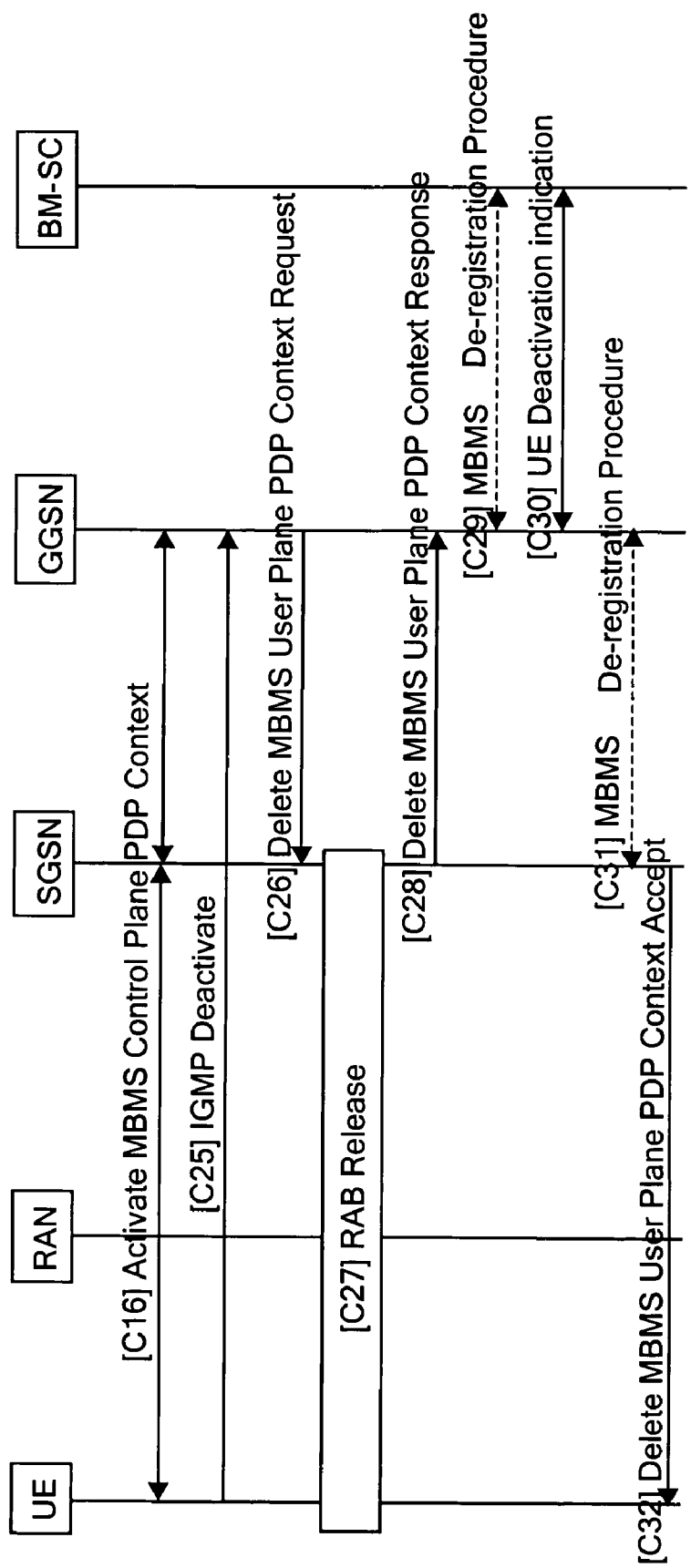
FIG. 10 shows a signaling diagram illustrating deactivation of an MBMS User Plane PDP context.

FIG. 10 shows a signaling diagram illustrating deactivation of an MBMS User Plane PDP context.

According to communication [C16] the procedure for activating the MBMS control plane PDP context as described with respect to FIG. 8 is performed.

In communication [C25] the UE sends an IGMP deactivate message over the created MBMS control plane PDP context to signal its de-selection of the particular multicast MBMS bearer service for which the control plane context has been created in communications [C16].

In communication [C26] the GGSN deletes the MBMS UE user plane context and sends a Delete MBMS user plane Context Request to the SGSN.

In communication [C27] RAB (Radio Access Bearer) release is performed.

In communication [C28] the SGSN deletes the MBMS UE user plane context and sends a Delete MBMS User Plane Context Response to the GGSN.

In communications [C29] MBMS De-registration procedure is performed between the GGSN and the BM-SC. If the GGSN does not have any more users interested in this MBMS bearer service and the "list of downstream nodes" in the corresponding MBMS Bearer Context is empty, the GGSN sends a MBMS De-Registration Request to the BM-SC Proxy and Transport function. The BM-SC Proxy and Transport function responds with a MBMS De-Registration Response and removes the identifier of the GGSN from the "list of downstream nodes" parameter in its MBMS Bearer Context.

In communication [C30] UE deactivation is indicated between the GGSN and the BM-SC.

In communications [C31] MBMS De-registration procedure is performed between the SGSN and the GGSN. If the SGSN does not have any more users interested in this MBMS bearer service and the "list of downstream nodes" in the corresponding MBMS Bearer Context is empty, the SGSN sends an MBMS De-Registration Request to the GGSN. The GGSN responds with an MBMS De-Registration Response and removes the identifier of the SGSN from the "list of downstream nodes" parameter in its MBMS Bearer Context.

Finally, in communication [C32] the SGSN sends a Delete MBMS User Plane Context Accept to the UE.

Figure 11:
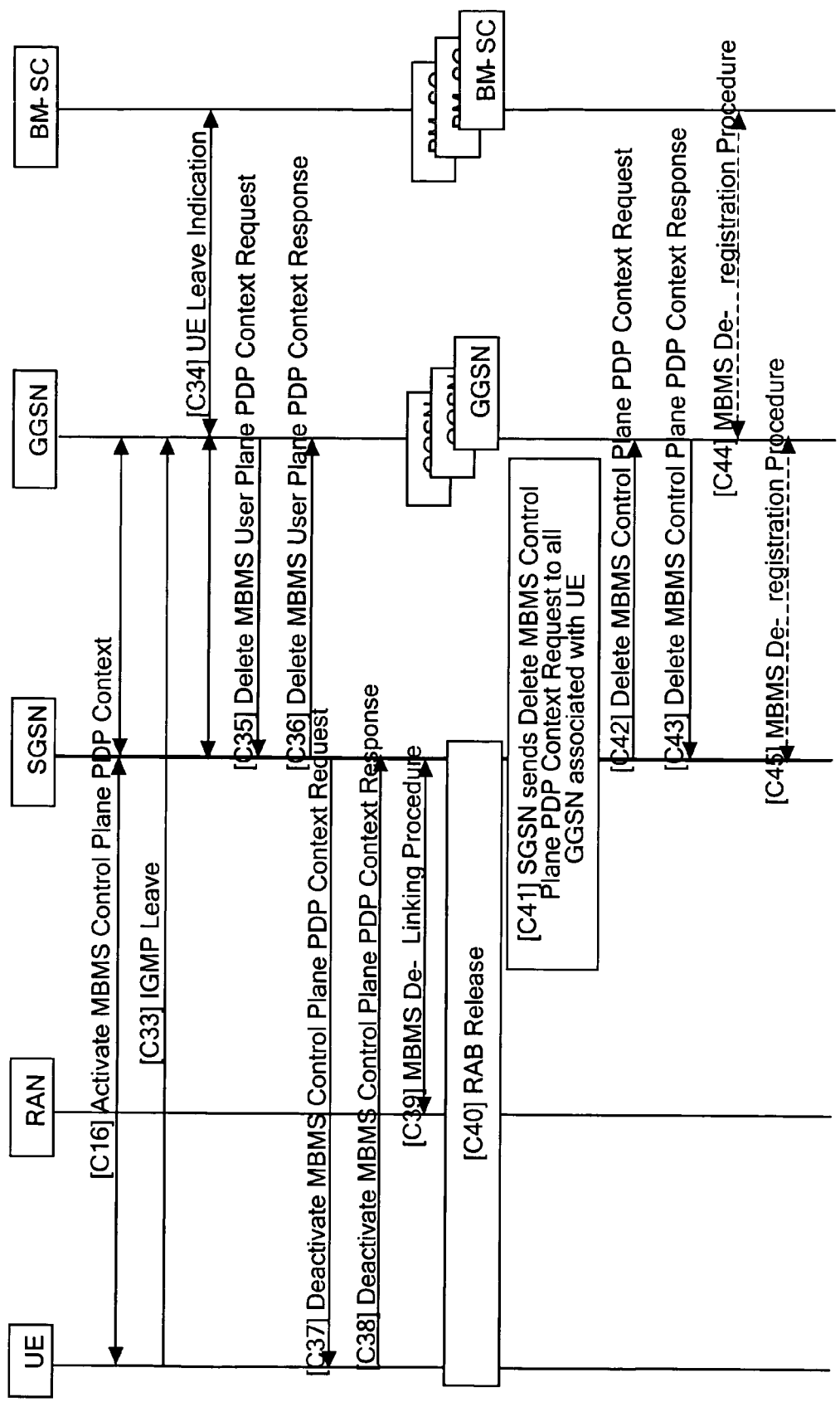
FIG. 11 shows a signaling diagram illustrating deactivation of an MBMS Control Plane PDP context.

FIG. 11 shows a signaling diagram illustrating deactivation of an MBMS Control Plane PDP context.

According to communication [C16] the procedure for activating the MBMS control plane PDP context as described with respect to FIG. 8 is performed.

In communication [C33] the UE sends an IGMP (IPv4) or MLD (IPv6) Leave message over the control plane PDP context created in [C16] to leave a particular multicast service identified by an IP multicast address.

In communication [C34] the GGSN sends a Leave Indication (IP multicast address, APN,IMSI) to the BM-SC Proxy and Transport function, which forwards it to the BM-SC Membership function, indicating that the UE is requesting to leave the multicast service identified by the IP multicast address.

In communication [C35] the GGSN deletes the MBMS UE user plane context and sends a Delete MBMS user plane Context Request to the SGSN.

In communication [C36] the SGSN deletes the MBMS UE user plane context and sends a Delete MBMS User Plane Context Response to the GGSN.

In communication [C37] the SGSN sends a Deactivate MBMS Control Plane PDP Context Request (TI) to the UE. The TI identifies the MBMS UE Control Plane PDP Context to be deleted by the UE.

In communication [C38] the UE deletes the MBMS UE Control Plane PDP Context and sends a Deactivate MBMS Control Plane PDP Context Accept (TI) to the SGSN.

In communications [C39] MBMS De-Linking procedure is performed. If the UE is PMM-CONNECTED and has been already linked towards the RAN, the SGSN sends a MBMS UE De-Linking Request to the RNC (IP multicast address, APN, TMGI). RAN deletes the MBMS UE Context and sends a MBMS UE De-Linking Response (TMGI) to the SGSN.

In communication [C40], if dedicated radio resources are currently assigned to the UE for the reception of the MBMS data, the RAN releases these radio resources. If shared radio resources are currently assigned for the distribution of the MBMS data, the RAN may decide to move the remaining UEs to dedicated resources.

In communications [C41] and [C42] the SGSN sends Delete MBMS Control Plane PDP Context request (MBMS_NSAPI) to all GGSNs associated with the UE (i.e. to each GGSN that holds the MBMS UE Control Plane PDP Context). These GGSNs may be different from the GGSN that receives IGMP Leave request in communication [C33].

In communications [C43] each requested GGSN deletes the MBMS UE Control Plane PDP Context and confirms the deactivation of the MBMS UE Control Plane PDP Context to the SGSN by sending a Delete MBMS Control Plane PDP Context Response to the SGSN, which then deletes the MBMS UE Context.

In communications [C44] MBMS De-registration procedure is performed between each requested GGSN and each registered BM-SC. If the requested GGSN does not have any more users interested in this MBMS bearer service and the "list of downstream nodes" in the corresponding MBMS Bearer Context is empty, the GGSN sends a MBMS De-Registration Request to the BM-SC Proxy and Transport function. The BM-SC Proxy and Transport function responds with a MBMS De-Registration Response and removes the identifier of the GGSN from the "list of downstream nodes" parameter in its MBMS Bearer Context.

In communications [C45] MBMS De-registration procedure is performed between the SGSN and each requested GGSN. If the SGSN does not have any more users interested in this MBMS bearer service and the "list of downstream nodes" in the corresponding MBMS Bearer Context is empty, the SGSN sends an MBMS De-Registration Request to each requested GGSN. The GGSN responds with an MBMS De-Registration Response and removes the identifier of the SGSN from the "list of downstream nodes" parameter in its MBMS Bearer Context.

According to the present invention, by providing only one control plane PDP context for all MBMS sessions the UE wants to create and one user plane PDP context for enabling one user plane flow for the UE at a given time, network resources can be saved and the user's experience can be enhanced.

It is to be understood that the above description is illustrative of the invention and is not to be construed as limiting the invention. Various modifications and applications may occur to those skilled in the art without departing from the true spirit and scope of the invention as defined by the appended claims.

The invention claimed is:
1. A method, comprising:
in response to joining at least two sessions of at least two multimedia broadcast/multicast services requested by a user equipment, creating a first context between the user equipment and network elements providing the at least two multimedia broadcast/multicast services, wherein the first context is a control plane context that supports signaling and the first context comprises, for each of the at least two multimedia broadcast/multicast services, user equipment specific information related to the multimedia broadcast/multicast service; and
in response to activation of one session being requested by the user equipment, where the one session is a session of a multimedia broadcast/multicast service for which user equipment specific information of the first context is related, creating a separate, second context between the user equipment and the network element providing the session, wherein the second context is a user plane context that supports user data of the multimedia broadcast/multicast service, and
wherein at least one of the first and second contexts are stored in the user equipment, and
the first context comprises information related to services that the user equipment has activated and information for inactive services where no second context has been created.
2. The method of claim 1, wherein the creating a first context comprises creating a tree structure virtually connecting the network elements providing the at least two multimedia broadcast/multicast services to the related sessions.

3. The method of claim 1, wherein the creating the second context comprises creating the second context such that one user plane flow of the user data of the multimedia broadcast/multicast service is enabled at a given time for the user equipment.

4. The method of claim 1, further comprising: updating the first context in response to joining a session of a further multimedia broadcast/multicast service that being requested by the user equipment, wherein the at least two multimedia broadcast/multicast services are updated with the further requested multimedia broadcast/multicast service.

5. The method of claim 1, further comprising: deleting at least one session of the sessions when a leaving operation is requested by the user equipment.

6. The method of claim 5, wherein the deleting at least one session comprises deleting the first and second contexts when a leaving operation to leave all of the sessions is requested by the user equipment.

7. The method of claim 1, further comprising: updating the second context when activation of another one of the sessions is requested by the user equipment, wherein the second context is updated with the network elements providing a multimedia broadcast/multicast service related to the another one session.

8. The method of claim 1, further comprising: deleting the second context when de-activation of the session is requested by the user equipment.

9. The method of claim 1, wherein the creating the first context and the second context comprises prioritizing the first and second contexts for the session for which activation has been requested.

10. The method of claim 1, wherein the sessions are classified in an active session comprising the session for which activation has been requested and inactive sessions comprising remaining sessions of the sessions.

11. The method of claim 1, wherein activation of the one session being requested by the user equipment comprises communicating an activation request using signaling supported by the first context.

12. An apparatus, comprising:
determining means for, upon a request for joining a session of a multimedia broadcast/multicast service by a user equipment, determining whether a first context between the user equipment and network elements providing any multimedia broadcast/multicast service is present, where the first context comprises, for each multimedia broadcast/multicast service joined by the user equipment, user equipment specific information related to the multimedia broadcast/multicast service; and
creating means for creating the first context between the user equipment and the network elements providing the multimedia broadcast/multicast service in response to a determination that the first context is not present, wherein the first context is a control plane context that supports signaling, and
wherein at least one of the first context and a separate, second context is stored in the user equipment,
where the second context is a user plane context that supports user data of the multimedia broadcast/multicast service, and
the first context comprises information related to services that the user equipment has activated and information for inactive services where no second context has been created.

13. The apparatus of claim 12, wherein
upon a request for activating one session of sessions for which user equipment specific information of the first context is related, the determining means determining whether the second context between the user equipment and network elements is present, said second context providing a multimedia broadcast/multicast service for any one session of the related sessions, and
the creating means creating the second context between the user equipment and the network elements providing a multimedia broadcast/multicast service related to the one session in response to a determination that the second context is not present, wherein the second context supports user data of the multimedia broadcast/multicast service related to the one session.

14. The apparatus of claim 13, wherein the creating means is further for creating the second context such that one user plane flow of the user data of the multimedia broadcast/multicast service is enabled at a given time for the user equipment.

15. The apparatus of claim 13, further comprising:
changing means for changing the second context by updating it with network elements providing the multimedia broadcast/multicast service related to the one session when it is determined that the second context is present.

16. The apparatus of claim 13, further comprising:
deleting means for, upon a request for de-activating the one session, deleting the second context in response to the request.

17. The apparatus of claim 12, wherein the creating means further creating a tree structure virtually connecting the network elements providing the multimedia broadcast/multicast services in a list.

18. The apparatus of claim 17, wherein
upon a request for leaving a session for which the first context is present, the updating means deleting a multimedia broadcast/multicast service related to the session from the list in response to the request, the apparatus further comprising
deleting means for deleting the first context in the network elements providing the multimedia broadcast/multicast service.

19. The apparatus of claim 17, wherein the sessions relating to the multimedia broadcast/multicast services in the list are classified in an active session comprising the session for which the first and second contexts are present and inactive sessions for which the first context is present and the second context is not present.

20. The apparatus of claim 12, further comprising:
updating means for updating a list of multimedia broadcast/multicast services related to the sessions for which the first context is present, when it is determined that the first context is present, by adding the multimedia broadcast/multicast service to the list.

21. The apparatus of claim 12, wherein the apparatus is serving general packet radio service support node.

22. An apparatus, comprising:
receiving means for receiving a request for joining a session relating to a multimedia broadcast/multicast service by a user equipment; and
creating means for creating a first context between the user equipment and network elements providing the multimedia broadcast/multicast service in response to a determination that the first context between the user equipment and network elements providing any multimedia broadcast/multicast service is not present, wherein the first context is a control plane context that supports signaling and the first context comprises, for each multimedia broadcast/multicast service joined by the user equipment, user equipment specific information related to the multimedia broadcast/multicast service, wherein the receiving means is for receiving a request for activating one session of sessions for which user equipment specific information of the first context is related, and wherein the creating means is for creating a separate, second context between the user equipment and network elements providing a multimedia broadcast/multicast service related to the one session in response to activation of the one session, wherein the second context is a user plane context that supports user data of the multimedia broadcast/multicast service, and at least one of the first and second contexts are stored in the user equipment, wherein the first context comprises information related to services that the user equipment has activated and information for inactive services where no second context has been created.

23. The apparatus of claim 22, further comprising:
updating means for updating a list of multimedia broadcast/multicast services related to the sessions for which the first context is present, and when it is determined that the first context is present, adding the multimedia broadcast/multicast service to the list.

24. The apparatus of claim 22, wherein
the receiving means is for receiving a request for leaving a session for which the first context is present, the apparatus further comprising
deleting means for deleting the first context in the network elements providing a multimedia broadcast/multicast service related to the session upon the request, wherein
the updating means updating by deleting the multimedia broadcast/multicast service from the list in response to the request.

25. The apparatus of claim 22, wherein
the receiving means receiving a request for de-activating the one session, and
the deleting means deleting the second context in response to the request.

26. The apparatus of claim 22, wherein the apparatus comprises a gateway general packet radio service support node.

27. An apparatus, comprising:
a processor configured to enable at least two multimedia broadcast/multicast services in a radio communication network system;
a transmitter configured to transmit a request to join a session relating to a multimedia broadcast/multicast service to perform at least one of create and update a first context between a user equipment and network elements providing the multimedia broadcast/multicast service, wherein the first context is a control plane context that supports signaling and the first context comprises, for each multimedia broadcast/multicast service joined by the user equipment, user equipment specific information related to the multimedia broadcast/multicast service,
wherein the transmitter is further configured to transmit a request to activate one session of sessions for which user equipment specific information of the first context is related to perform at least one of create or update a separate, second context between the user equipment and network elements to provide a multimedia broadcast/multicast service related to the one session, wherein the second context is a user plane context that supports user data of the multimedia broadcast/multicast service related to the one session, and at least one of the first and second contexts are stored in the user equipment, wherein the first context comprises information related to services that the user equipment has activated and information for inactive services where no second context has been created.

28. The apparatus of claim 27, wherein the transmitter is further configured to transmit a request to de-activate the one session and to delete the second context.

29. The apparatus of claim 27, wherein the transmitter is further configured to transmit a request to leave a session for which the first context is present to delete the first and second contexts in the network elements providing a multimedia broadcast/multicast service to which the session relates.

30. A method, comprising:
upon a request to join a session of a multimedia broadcast/multicast service by a user equipment, determining whether a first context between the user equipment and network elements providing any multimedia broadcast/multicast service is present, where the first context comprises, for each multimedia broadcast/multicast service joined by the user equipment, user equipment specific information related to the multimedia broadcast/multicast service; and
creating the first context between the user equipment and the network elements providing the multimedia broadcast/multicast service in response to a determination that the first context is not present, wherein the first context is a control plane context that supports signaling,
wherein upon a request to activate one session of sessions for which user equipment specific information of the first context is related, determining whether a separate, second context is present between the user equipment and network elements providing a multimedia broadcast/multicast service related to any one session of the sessions, and creating the second context between the user equipment and network elements providing a multimedia broadcast/multicast service related to the one session in response to a determination that the second context is not present, wherein the second context is a user plane context that supports user data of the multimedia broadcast/multicast service related to the one session, and at least one of the first and second contexts are stored in the user equipment,
wherein the first context comprises information related to services that the user equipment has activated and information for inactive services where no second context has been created.

31. A method, comprising:
receiving a request to join a session relating to a multimedia broadcast/multicast service by a user equipment; and
creating a first context between the user equipment and network elements providing the multimedia broadcast/multicast service response to a determination that the first context is not present, wherein the first context is a control plane context that supports signaling and the first context comprises, for each multimedia broadcast/multicast service joined by the user equipment, user equipment specific information related to the multimedia broadcast/multicast service,
receiving a request to activate one session of sessions for which user equipment specific information of the first context is related, and
creating a separate, second context between the user equipment and network elements providing a multimedia broadcast/multicast service related to the one session, wherein the second context is a user plane context that supports user data of the multimedia broadcast/multicast service related to the one session, and at least one of the first and second contexts are stored in the user equipment, wherein the first context comprises information related to services that the user equipment has activated and information for inactive services where no second context has been created.

32. A method, comprising:

transmitting a request to join a session relating to a multimedia broadcast/multicast service to perform at least one of create and update a first context between a user equipment and network elements providing the multimedia broadcast/multicast service, wherein the first context is a control plane context that supports signaling and the first context comprises, for each multimedia broadcast/multicast service joined by the user equipment, user equipment specific information related to the multimedia broadcast/multicast service; and transmitting a request to activate one session of sessions for which user equipment specific information of the first context is related to perform at least one of create or update a separate, second context between the user equipment and network elements providing a multimedia broadcast/multicast service related to the one session, wherein the second context is a user plane context that supports user data of the multimedia broadcast/multicast service related to the one session, and at least one of the first and second contexts are stored in the user equipment, wherein the first context comprises information related to services that the user equipment has activated and information for inactive services where no second context has been created.

33. A computer program product embodied on a non-transitory computer readable medium comprising instructions that when executed causes a processor to perform:

receiving a request to join a session relating to a multimedia broadcast/multicast service by a user equipment; and creating a first context between the user equipment and network elements providing the multimedia broadcast/multicast service in response to a determination that the first context is not present, wherein the first context is a control plane context that supports signaling and the first context comprises, for each multimedia broadcast/multicast service joined by the user equipment, user equipment specific information related to the multimedia broadcast/multicast service, receiving a request to activate one session of sessions for which user equipment specific information of the first context is related, and creating a separate, second context between the user equipment and network elements providing a multimedia broadcast/multicast service related to the one session, and wherein the second context is a user plane context that supports user data of the multimedia broadcast/multicast service related to the one session, and at least one of the first and second contexts are stored in the user equipment, wherein the first context comprises information related to services that the user equipment has activated and information for inactive services where no second context has been created.

34. The computer program product according to claim 33, wherein the program is directly loadable into an internal memory.

\* \* \* \* \*